(12) United States Patent
Kawashima et al.

(10) Patent No.: US 9,931,270 B2
(45) Date of Patent: Apr. 3, 2018

(54) ELECTROMAGNETIC VALVE SYSTEM

(71) Applicant: NITTO KOHKI CO., LTD., Tokyo (JP)

(72) Inventors: Hiroki Kawashima, Tokyo (JP); Haruki Nakao, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 501 days.

(21) Appl. No.: 14/608,573

(22) Filed: Jan. 29, 2015

(65) Prior Publication Data

US 2015/0141887 A1    May 21, 2015

Related U.S. Application Data

(63) Continuation of application No. PCT/JP2013/070704, filed on Jul. 31, 2013.

(30) Foreign Application Priority Data

Jul. 31, 2012  (JP) ................... 2012-169053

(51) Int. Cl.
*A61H 9/00* (2006.01)
*F16K 27/00* (2006.01)
(Continued)

(52) U.S. Cl.
CPC ......... *A61H 9/0078* (2013.01); *A61H 9/0092* (2013.01); *F16K 11/22* (2013.01);
(Continued)

(58) Field of Classification Search
CPC .... A61H 9/005; A61H 9/0078; A61H 9/0092; A61H 7/007; A61H 7/008; A61H 23/04;
(Continued)

(56) References Cited

U.S. PATENT DOCUMENTS 2,689,585 A * 9/1954 Presnell ................ F15B 13/04
  137/624.27
4,374,518 A * 2/1983 Villanueva ........... A61H 9/0078
  601/152
(Continued)

FOREIGN PATENT DOCUMENTS

| JP | 2001-8993 | 1/2001 |
| JP | 2002-191656 | 7/2002 |
| JP | 3909789 | 4/2007 |
| JP | 2008-11923 | 1/2008 |
| JP | 2008-32204 | 2/2008 |

OTHER PUBLICATIONS

International Search Report dated Sep. 10, 2013 in corresponding International Application No. PCT/JP2013/070704.

*Primary Examiner* — Justine Yu
*Assistant Examiner* — Christopher Miller
(74) *Attorney, Agent, or Firm* — Wenderoth, Lind & Ponack, L.L.P.

(57) ABSTRACT

An electromagnetic valve system for carrying out a compressed air supply to and evacuation from a plurality of air chambers of massage instruments of a pneumatic massage device includes a plurality of first electromagnetic valves each to be connected to a corresponding one of the air chambers; a second electromagnetic valve including a first aperture which communicates with external air; and a plurality of first check valves each within a header in an intermediate location between the second electromagnetic valve and a corresponding one of the air chambers with a connection tube therebetween, the first check valves allowing air to pass from the air chambers toward the second electromagnetic valve only when air pressure on a second electromagnetic valve side is lower than air pressure on an air chamber side.

12 Claims, 5 Drawing Sheets

(51) Int. Cl.
*F16K 11/22* (2006.01)
*F16K 11/24* (2006.01)
*F16K 15/18* (2006.01)

(52) U.S. Cl.
CPC ............ *F16K 11/24* (2013.01); *F16K 15/185* (2013.01); *F16K 27/003* (2013.01); *A61H 2201/0157* (2013.01); *A61H 2201/0173* (2013.01); *A61H 2201/1642* (2013.01); *A61H 2201/5002* (2013.01); *A61H 2209/00* (2013.01); *Y10T 137/87217* (2015.04)

(58) Field of Classification Search
CPC ............ A61H 23/02; A61H 2201/0157; A61H 2201/0103; A61H 2201/1207; A61H 2201/1238; A61H 2201/1246; A61H 2201/1409; A61H 2201/50; A61H 2201/501; A61H 2201/5002; A61H 2201/5005; A61H 2203/0425; A61H 2203/0431; F16K 11/22; F16K 11/24; F15B 13/10; F15B 20/002; F15B 2211/8623; F15B 2211/8626; F15B 2211/8755; F15B 2211/87552
USPC ................................ 5/713; 91/450, 451, 449
See application file for complete search history.

(56) References Cited

U.S. PATENT DOCUMENTS

| | | | | |
|---|---|---|---|---|
| 4,865,020 A | * | 9/1989 | Bullard | ................ A61H 9/0078 601/152 |
| 4,941,458 A | * | 7/1990 | Taheri | ................ A61H 9/0078 601/152 |
| 5,035,016 A | * | 7/1991 | Mori | ................ A61G 7/05776 5/713 |
| 5,343,893 A | * | 9/1994 | Hogan | ............... A61G 7/05776 137/624.13 |
| 5,584,466 A | * | 12/1996 | Fukano | ................ F16K 31/082 251/129.15 |
| 6,355,008 B1 | * | 3/2002 | Nakao | ................ A61H 9/0078 601/149 |
| 6,629,941 B1 | | 10/2003 | Ishibashi et al. | |
| 6,691,740 B2 | * | 2/2004 | Yoshida | ................ F16K 31/082 137/625.65 |
| 7,258,676 B2 | * | 8/2007 | Calderon | ............. A61H 9/0078 601/152 |
| 2005/0187500 A1 | * | 8/2005 | Perry | ................ A61H 9/0078 601/152 |
| 2009/0240179 A1 | | 9/2009 | Nakao et al. | |
| 2009/0312674 A1 | | 12/2009 | Nakao et al. | |
| 2010/0031449 A1 | * | 2/2010 | Cheng | ................ A61H 9/0078 5/713 |

* cited by examiner

ELECTROMAGNETIC VALVE SYSTEM

TECHNICAL FIELD

The present invention relates to an electromagnetic valve system and also relates to a pneumatic massage apparatus having the electromagnetic valve system.

BACKGROUND ART

There has heretofore been known a pneumatic massage apparatus having a plurality of air chambers to be fitted around an arm or a leg, in which each air chamber is inflated and deflated by supplying and discharging compressed air thereinto and therefrom, respectively, to thereby massage the body. Such a massage apparatus uses an electromagnetic valve system having a plurality of electromagnetic valves for supplying and discharging compressed air into and from the plurality of air chambers, respectively.

Electromagnetic valves used in such an electromagnetic valve system are three-way valves switchable between a position where compressed air is supplied into air chambers of a massage device and a position where the compressed air in the air chambers is released to the atmosphere. Usually, the electromagnetic valves are configured as follows: When a solenoid of each electromagnetic valve is energized, a valve element is moved to a first position with electromagnetic force against urging force of a spring to supply compressed air into the associated air chamber. When the solenoid is not energized, the valve element is held in a second position by being urged with the spring to discharge the compressed air from the air chamber (Japanese Patent No. 3909789).

Technical Problem

Conventional pneumatic massage apparatuses of the type described above typically use an AC power supply. In view of convenience in use, however, it is desirable to use a battery as a power supply to provide a portable pneumatic massage apparatus.

SUMMARY OF INVENTION

The present invention has been made in view of the above-described convenience in use, and it is an object of the present invention to provide a pneumatic massage apparatus usable even with a battery power supply and to provide an electromagnetic valve system suitable for use in the pneumatic massage apparatus.

Solution to Problem

The present invention provides an electromagnetic valve system for supplying and discharging compressed air into and from a plurality of air chambers of a massage device of a pneumatic massage apparatus. The electromagnetic valve system includes: a compressed air inlet for receiving compressed air; a plurality of first electromagnetic valves to be connected to the air chambers, respectively, of the massage device, the first electromagnetic valves each having a first opening communicating with the compressed air inlet, a second opening communicating with an outside atmosphere, and a third opening for communicating with an associated one of the air chambers, and the first electromagnetic valves each being switchable between a first position where the second opening is closed and the first opening and the third opening are communicated with each other and a second position where the first opening is closed and the second opening and the third opening are communicated with each other; a second electromagnetic valve having a first opening communicating with the outside atmosphere and a second opening for communicating with the plurality of air chambers, the second electromagnetic valve being switchable between a first position where communication between the first opening and second opening of the second electromagnetic valve is cut off and a second position where the first opening and second opening of the second electromagnetic valve are communicated with each other; and a plurality of first check valves provided, respectively, between the air chambers and the second opening of the second electromagnetic valve, the first check valves allowing air to flow from the air chambers toward the second opening of the second electromagnetic valve only when the air pressure on the second opening side of the second electromagnetic valve is lower than the air pressure on the air chamber side. The first electromagnetic valves are self-holding electromagnetic valves that maintain either the first or second position assumed thereby when a supply voltage to the first electromagnetic valves drops below a given value even after the supply voltage to the first electromagnetic valves has dropped below the given value, and the second electromagnetic valve is an automatic release type electromagnetic valve that switches over to the second position when a supply voltage to the second electromagnetic valve drops below a given value.

The first electromagnetic valves for supplying and discharging compressed air into and from the air chambers of the massage device are self-holding electromagnetic valves. Therefore, electric power is mainly consumed only at the moment when the position of the valve element is switched between the first position and the second position. Accordingly, the amount of electric power consumed by the electromagnetic valves can be reduced, and it becomes possible to use the pneumatic massage apparatus for a longer period of time with limited power supply capacity. On the other hand, the second electromagnetic valve is an automatic release type electromagnetic valve. Therefore, when the electric power supplied to the second electromagnetic valve is cut off or drops below a given value, the second electromagnetic valve switches over to the second position to release the compressed air in each air chamber to the atmosphere. Accordingly, it is also possible to ensure safety in emergency situations.

Preferably, the electromagnetic valve system may further include a control device controlling the first and second electromagnetic valves. The control device controls the second electromagnetic valve such that the voltage supply to the second electromagnetic valve is stopped when the supply voltage to the second electromagnetic valve drops below a set value, thereby bringing the second electromagnetic valve to the second position.

Specifically, the second electromagnetic valve may further have a third opening communicating with the compressed air inlet, so that, when the second electromagnetic valve is in the first position, the first opening of the second electromagnetic valve is closed, and the second opening and third opening of the second electromagnetic valve are communicated with each other, and when the second electromagnetic valve is in the second position, the third opening of the second electromagnetic valve is closed, and the first opening and second opening of the second electromagnetic valve are communicated with each other.

In this case, the electromagnetic valve system may further include a second check valve provided between the compressed air inlet and the third opening of the second electromagnetic valve, the second check valve allowing air to flow only in a direction from the compressed air inlet toward the third opening of the second electromagnetic valve.

Alternatively, the electromagnetic valve system may be arranged such that the second opening of the second electromagnetic valve also communicates with the compressed air inlet, and that the second electromagnetic valve is configured to close the second opening when the second electromagnetic valve is in the first position, and to open the second opening so as to communicate the first opening and the second opening with each other when the second electromagnetic valve is in the second position.

In this case, the electromagnetic valve system may further include a second check valve provided between the compressed air inlet and the second opening of the second electromagnetic valve and hence between the compressed air inlet and the air chambers, the second check valve allowing air to flow only in a direction from the compressed air inlet toward the second opening of the second electromagnetic valve and the air chambers.

Even when the pressure on the compressed air inlet side drops, the air on the second electromagnetic valve side is prevented from flowing backward, which would otherwise cause a drop in pressure on the second electromagnetic valve side. Therefore, when the air pressure on the second opening side of the second electromagnetic valve becomes lower than the air pressure on the air chamber side, the first electromagnetic valves are prevented from opening unnecessarily.

More preferably, the electromagnetic valve system may further include a third check valve provided between the compressed air inlet and the first opening of each of the first electromagnetic valves, the third check valve allowing air to flow only in a direction from the compressed air inlet toward the first opening.

Preventing air from flowing out toward the compressed air inlet makes it possible to reduce or stop the output of a compressed air supply device, which is connected to the compressed air inlet, when it is unnecessary to supply new compressed air into any of the air chambers, and it is therefore possible to further reduce the power consumption.

Preferably, the supply voltage may be supplied by a battery.

Specifically, the first electromagnetic valves may each have: a solenoid coil; a plunger magnetically attracted to the solenoid coil; a valve element attached to the distal end of the plunger to selectively close the first opening and second opening of the first electromagnetic valve; a spring urging the plunger in a direction opposite to a direction in which the plunger is attracted to the solenoid coil; and a permanent magnet magnetically attracting the plunger to maintain the position of the plunger. By applying a forward voltage to the solenoid coil to generate a magnetic force that increases magnetic attraction action of the permanent magnet, the plunger is attracted against urging force of the spring to bring the first electromagnetic valve to the first position. By applying a reverse voltage to the solenoid coil to generate a magnetic force that reduces the magnetic attraction action of the permanent magnet, the plunger is moved by the urging force of the spring to bring the first electromagnetic valve to the second position.

With the above-described structure of the first electromagnetic valves, the solenoid coil is excited only at the moment when the valve element is to be moved between the first position and the second position. While the valve element is being held in the first or second position, the position of the valve element is maintained by the permanent magnet or the spring; therefore, it is unnecessary to excite the solenoid coil. Thus, no electric power is consumed while the valve element is being held in either of the first and second positions, and the period of time that electric power supply is needed becomes very short. Accordingly, the power consumption can be further reduced.

In addition, the present invention provides a pneumatic massage apparatus including: a massage device fittable to one's body, the massage device having a plurality of air chambers that are inflated and deflated by supplying and discharging compressed air thereinto and therefrom, respectively, to thereby act on the body; a compressed air supply device prepared separately from the massage device; and any of the above-described electromagnetic valve systems, wherein the compressed air inlet is connected to the compressed air supply device, and the third opening of each of the first electromagnetic valves is connected to an associated one of the air chambers. When the supply voltage to the second electromagnetic valve drops below a given value, the second electromagnetic valve switches over to the second position to allow air in any of the air chambers that is in an inflated state to be released to the atmosphere through the first opening of the second electromagnetic valve.

Embodiments of the present invention will be explained below based on the accompanying drawings.

DESCRIPTION OF EMBODIMENTS

Figure 1:
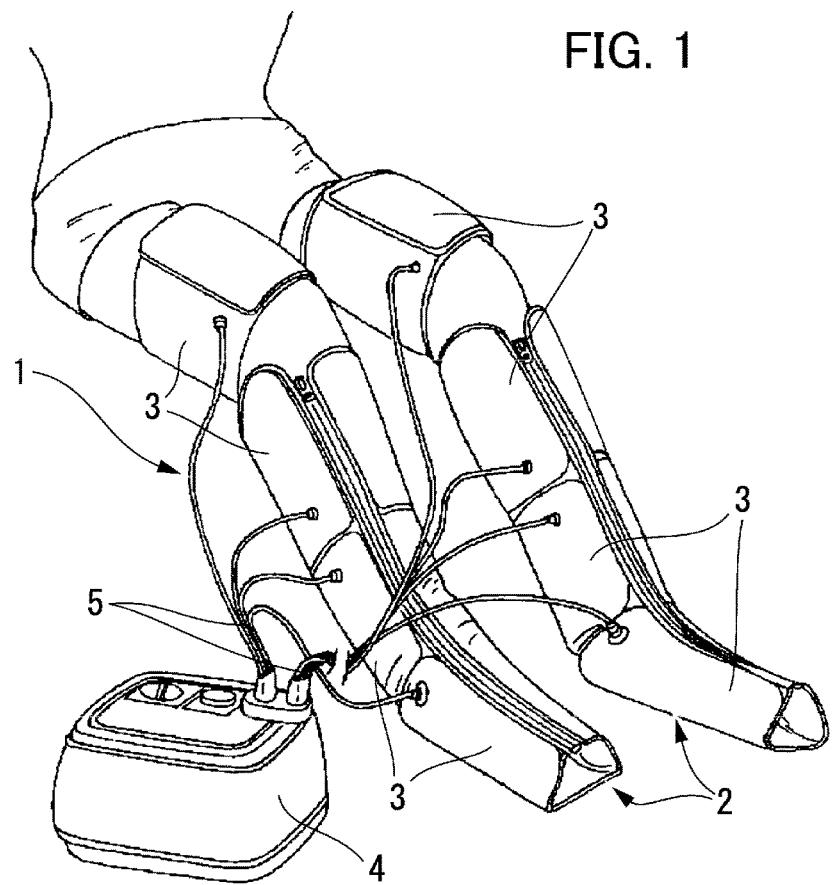
FIG. 1 is an illustration of a pneumatic massage apparatus in which is used an electromagnetic valve system according to the present invention.

A massage apparatus 1 shown in FIG. 1 has massage devices 2 to be fitted around legs, respectively. Each massage device 2 has a plurality of air chambers 3 disposed in series in the longitudinal direction thereof. The massage apparatus 1 further has a compressed air control unit 4 for supplying and discharging compressed air into and from each of the air chambers 3. The air chambers 3 of the massage devices 2 are connected to the compressed air control unit 4 through a plurality of tubes 5, respectively, for supplying and discharging compressed air.

Figure 2:
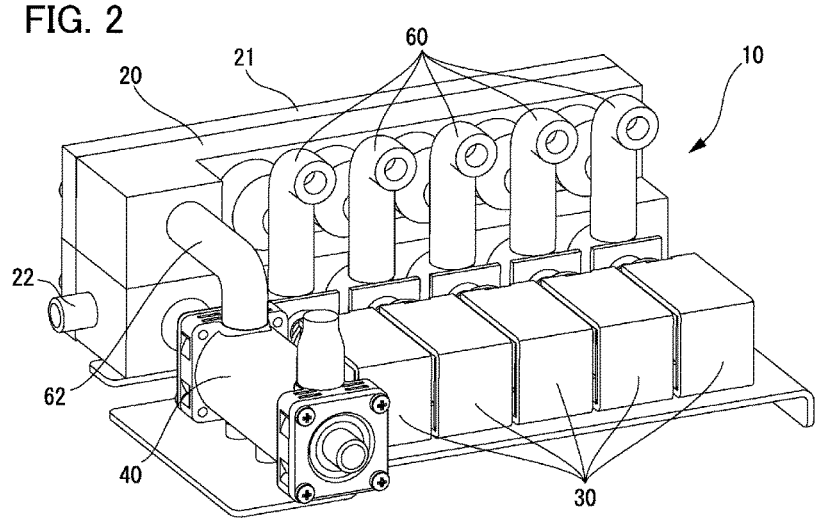
FIG. 2 is a perspective view of an electromagnetic valve system according to a first embodiment of the present invention.

The compressed air control unit 4 has a compressed air supply device (not shown), e.g. an air pump, accommodated in a housing, an electromagnetic valve system 10 according to a first embodiment of the present invention, which is connected to the compressed air supply device, and a battery (not shown) for supplying electric power to the compressed air supply device and the electromagnetic valve system 10. The electromagnetic valve system 10 has, as shown in FIG. 2, a header 20 having a compressed air inlet 22 connected to the compressed air supply device, a plurality of first electromagnetic valves 30 connected to the air chambers 3 through the tubes 5, respectively, and a second electromagnetic valve 40 communicated with the header 20.

Figure 3:
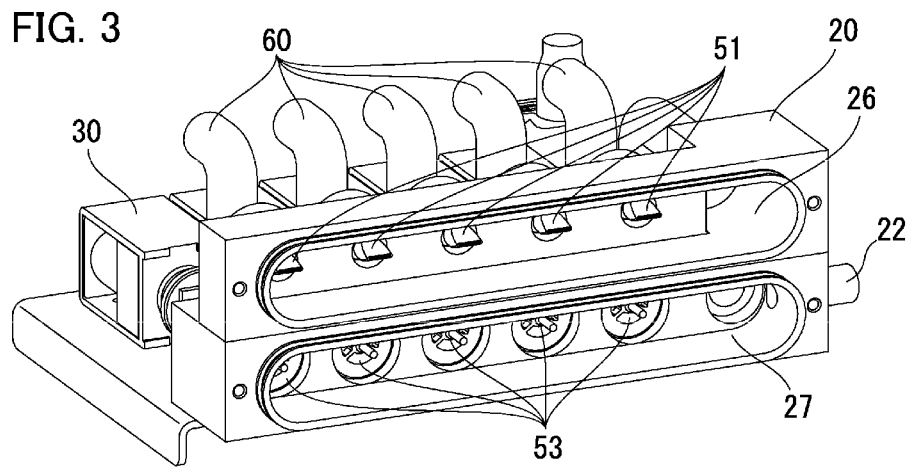
FIG. 3 is a perspective view showing the interior of a header of the electromagnetic valve system shown in FIG. 2.
Figure 6:
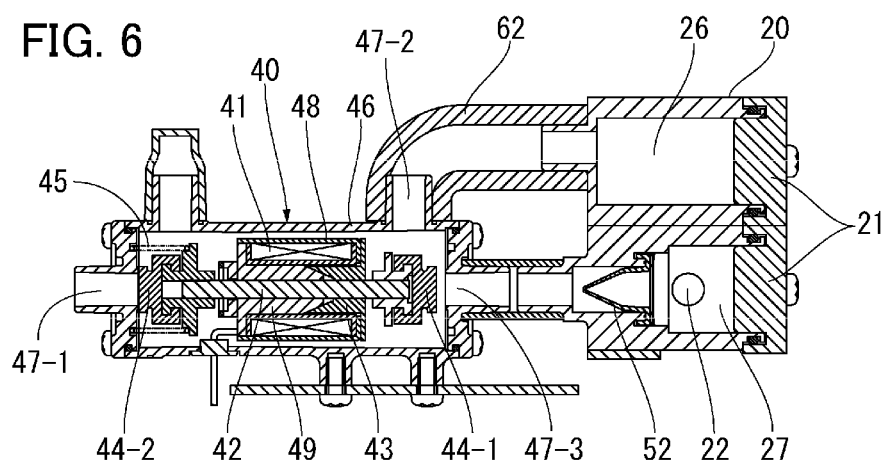
FIG. 6 is a sectional view of a second electromagnetic valve of the electromagnetic valve system shown in FIG. 2 when the second electromagnetic valve is in a first position.
Figure 7:
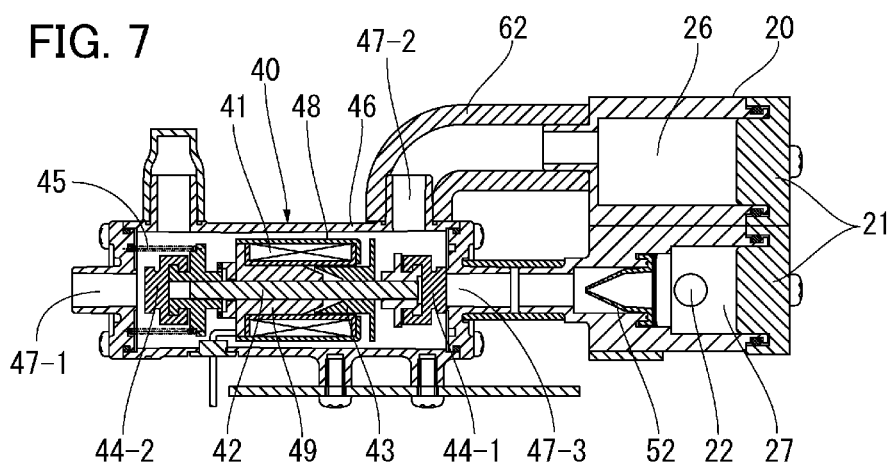
FIG. 7 is a sectional view of the second electromagnetic valve of the electromagnetic valve system shown in FIG. 2 when the second electromagnetic valve is in a second position.

As will be understood from FIG. 3, which shows the electromagnetic valve system 10 with a header cap 21 removed therefrom, the header 20 has an upper chamber 26 and a lower chamber 27. As shown in FIGS. 3, 6 and 7, the lower chamber 27 is communicated with the compressed air inlet 22 and also communicated with the upper chamber 26 through the second electromagnetic valve 40.

Figure 4:
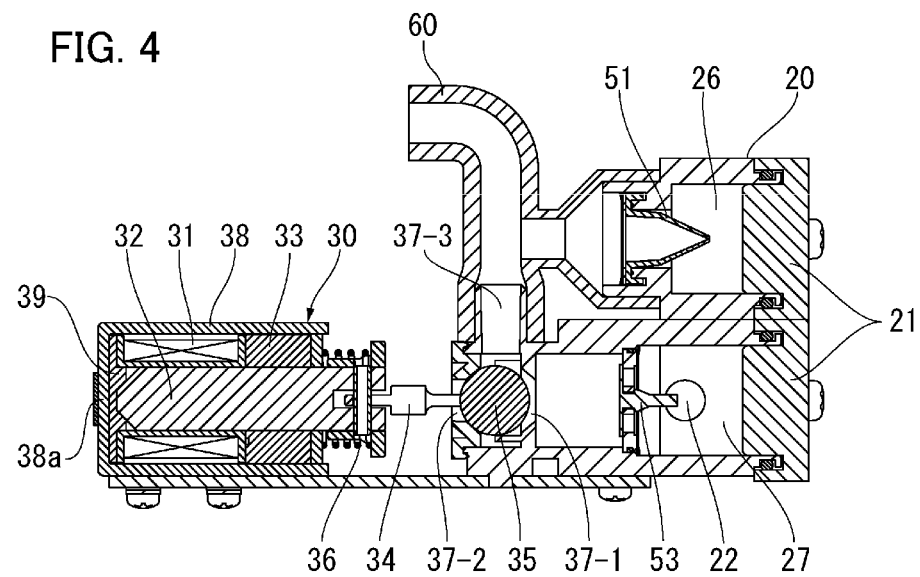
FIG. 4 is a sectional view of a first electromagnetic valve of the electromagnetic valve system shown in FIG. 2 when the first electromagnetic valve is in a first position.
Figure 5:
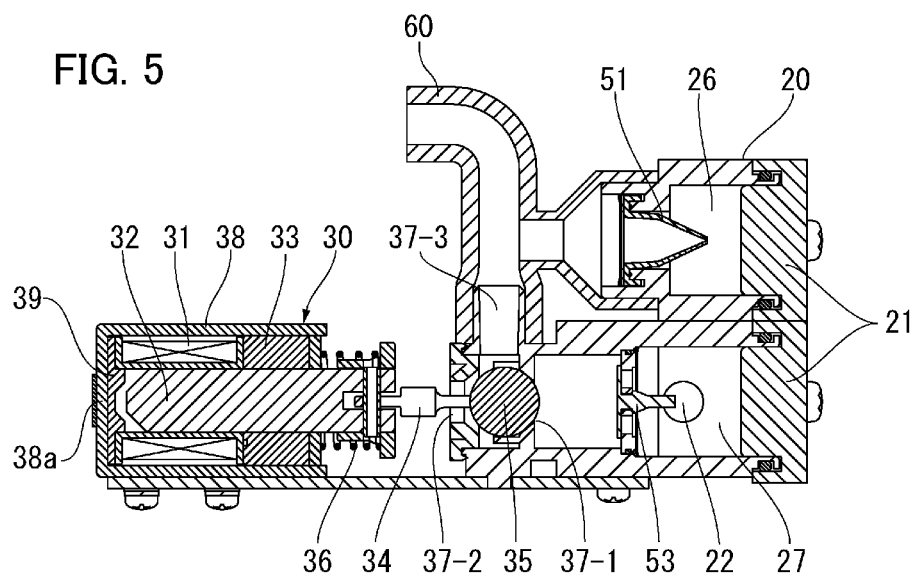
FIG. 5 is a sectional view of the first electromagnetic valve of the electromagnetic valve system shown in FIG. 2 when the first electromagnetic valve is in a second position.

As shown in FIGS. 4 and 5, the lower chamber 27 is connected to the first electromagnetic valves 30 through respective check valves 53 (corresponding to a third check valve in the appended claims) that allow the compressed air supplied from the compressed air inlet 22 to be discharged from the lower chamber 27. The upper chamber 26 is communicated with supply pipes 60 through a plurality of duckbill check valves 51 (corresponding to a first check valve in the appended claims), respectively. The check valves 51 block the flow of air from the supply pipes 60 toward the upper chamber 26 when the pressure of compressed air from the compressed air inlet 22 is applied to the upper chamber 26 through the second electromagnetic valve 40.

The first electromagnetic valves 30 each have a solenoid coil 31, a plunger 32 provided in the solenoid coil 31 to extend in the longitudinal direction of the solenoid coil 31, an annular-shaped permanent magnet 33 provided around the plunger 32 adjacently to the solenoid coil 31, a housing 38 accommodating the solenoid coil 31, the permanent magnet 33, and the plunger 32, a spherical valve element 35 secured to the distal end of the plunger 32 through a valve element support member 34, and a spring 36 urging the plunger 32 rightward as seen in the figures. Each first electromagnetic valve 30 is a three-way valve having a first opening 37-1 communicating with the lower chamber 27 of the header 20, a second opening 37-2 open to the atmosphere, and a third opening 37-3 connected to the associated supply pipe 60. The three-way valve is configured to switch communication between the three openings with the spherical valve element 35. The first electromagnetic valve 30 is driven between a first position shown in FIG. 4 and a second position shown in FIG. 5. To bring the first electromagnetic valve 30 to the first position, a forward voltage is applied to the solenoid coil 31 to generate a magnetic field producing lines of magnetic force in the same direction as the direction of lines of magnetic force generated by the magnetic field of the permanent magnet 33, which pass through the plunger 32. Consequently, the magnetic flux density of the lines of magnetic force passing through the plunger 32 increases, thus causing the plunger 32 to be attracted leftward as seen in the figures against the urging force of the spring 36. The housing 38 is formed from a magnetic material to form a magnetic circuit of the permanent magnet 33. The magnetic reluctance of the magnetic circuit is reduced by the plunger 32 brought to the first position shown in FIG. 4 because the plunger 32 is close to an end wall 38a of the housing 38. Accordingly, even after the application of the forward voltage to the solenoid coil 31 has been stopped, the plunger 32 is held in the first position by the magnetic attraction action of the permanent magnet 33 against the urging force of the spring 36. To switch the first electromagnetic valve 30 from the first position to the second position, a reverse voltage is applied to the solenoid coil 31 to generate a magnetic field that weakens the magnetic attraction action of the permanent magnet 33, thereby allowing the plunger 32 to be pushed out rightward from the housing 38 by the urging force of the spring 36. As the plunger 32 is pushed out from the housing 38, the plunger 32 is brought away from the end wall 38a of the housing 38, and the magnetic reluctance of the above-described magnetic circuit increases. Accordingly, the magnetic attraction action of the permanent magnet 33 decreases. Therefore, the plunger 32 is held in the second position by the urging force of the spring 36 even after the application of the reverse voltage to the solenoid coil 31 has been stopped. The first electromagnetic valve 30 is a self-holding electromagnetic valve that needs to apply a voltage to the solenoid coil 31 only when the plunger 32 is to be switched between the first and second positions and that need not apply a voltage to the solenoid coil 31 when the plunger 32 is hold in either the first or second position. Accordingly, the period of time that electric power is supplied to the first electromagnetic valves 30 during the operation of the massage apparatus 1 becomes very short; therefore, the power consumption is reduced. The housing 38, which accommodates the solenoid coil 31 and so forth, is provided therein with a shock absorption member 39 for receiving the plunger 32 as attracted by the solenoid coil 31 to reduce impact noise when the plunger 32 is attracted. To increase the magnetic attraction action of the permanent magnet 33 when the first electromagnetic valve 30 is brought to the first position shown in FIG. 4, it is preferable for the shock absorption member 39 to have magnetic properties.

When the first electromagnetic valve 30 is in the first position shown in FIG. 4, the second opening 37-2 is closed by the spherical valve element 35, and the first opening 37-1 and the third opening 37-3 are communicated with each other. Consequently, compressed air supplied from the compressed air inlet 22 is supplied into the associated air chamber 3 through the check valve 53 and through the first and third openings 37-1 and 37-3 of the first electromagnetic valve 30, causing the air chamber 3 to be inflated. When the first electromagnetic valve 30 is in the second position shown in FIG. 5, the first opening 37-1 of the first electromagnetic valve 30 is closed by the spherical valve element 35, and the third opening 37-3 and the second opening 37-2 are communicated with each other. Consequently, compressed air in the associated air chamber 3 is discharged into the atmosphere through the second opening 37-2, and thus the air chamber 3 deflates. The pneumatic massage apparatus 1 is configured to perform a desired massaging operation by controlling the first electromagnetic valve 30 connected to each air chamber 3 between the first position and the second position through a control device (not shown).

The second electromagnetic valve 40 is, as shown in FIGS. 6 and 7, provided with a solenoid coil 41 disposed in a coil housing 48, a shaft 42 extending through the solenoid coil 41, a plunger 43 secured around the shaft 42 inside the solenoid coil 41, a plunger receiving member 49 secured to the coil housing 48 at the left side of the plunger 43 inside the solenoid coil 41, a first valve element 44-1 secured to one end of the shaft 42, a second valve element 44-2 secured to the other end of the shaft 42, and a spring 45 urging the shaft 42, the plunger 43 and the first and second valve elements 44-1 and 44-2 rightward as seen in the figures. A valve housing 46 accommodating the solenoid coil 41 and so forth is provided with a first opening 47-1 open to the outside, a second opening 47-2 connected to the upper chamber 26 of the header 20 through a connecting pipe 62, and a third opening 47-3 communicated with the lower chamber 27 through a duckbill check valve 52 (corresponding to a second check valve in the appended claims). When the solenoid coil 41 is supplied with electric power and thus excited, the plunger 43 is, as shown in FIG. 6, attracted leftward as seen in the figure against the urging force of the spring 45. When the second electromagnetic valve 40 is in this first position, the first opening 47-1 of the second electromagnetic valve 40 is closed by the second valve element 44-2, and the third opening 47-3 is open. Consequently, compressed air supplied from the compressed air inlet 22 is supplied from the lower chamber 27 into the upper chamber 26 of the header 20 through the check valve 52 and through the third opening 47-3 and the second opening 47-2. When the electric power supplied to the second electromagnetic valve 40 drops below a given value, the magnetic force of the solenoid coil 41 of the second electromagnetic valve 40 that has been attracting the plunger 43 weakens, so that the plunger 43 is, as shown in FIG. 7, moved rightward as seen in the figure by the urging force of the spring 45, thereby bringing the second electromagnetic valve 40 to a second position. When the second electromagnetic valve 40 is in the second position, the third opening 47-3 is closed by the first valve element 44-1, and the first opening 47-1 is open. Accordingly, the compressed air in the upper chamber 26 of the header 20 is discharged, and the pressure in the upper chamber 26 reduces. Consequently, the duckbill check valves 51 (FIGS. 4 and 5) open, and the compressed air in the air chambers 3 enters the upper chamber 26 through the tubes 5 and the supply pipes 60 and further passes through the connecting pipe 62 and through the second electromagnetic valve 40 from the second opening 47-2 to the first opening 47-1 before being discharged into the atmosphere. Thus, when the electric power supplied to the second electromagnetic valve 40 drops below a given value, compressed air remaining in the air chambers 3 of the massage devices 2 is discharged to deflate the air chambers 3, thereby eliminating pressure to the user of the massage devices 2 to bring the massage apparatus to a safe condition. It should be noted that, in this specification, an electromagnetic valve that automatically shifts to the second position when the supply of electric power is stopped, as in the case of the second electromagnetic valve 40, is referred to as an "automatic release type electromagnetic valve".

It should be noted that the arrangement may be as follows: The control device, which controls each electromagnetic valve, monitors the voltage of a battery used as a power supply of the massage apparatus, and while doing so, the control device stops the voltage supply to the second electromagnetic valve 40 to shift the valve 40 to the second position when the voltage supplied to the second electromagnetic valve 40 becomes lower than a certain set value, thereby discharging compressed air from the air chambers 3 to stop the massage apparatus in a safe condition.

The following is an explanation of a basic operation of the massage apparatus 1 shown in FIG. 1. Before the massage apparatus 1 is started, the first electromagnetic valves 30 and the second electromagnetic valve 40 are in their respective second positions (FIGS. 5 and 7). When the power supply is turned on, the second electromagnetic valve 40 assumes the first position (FIG. 6), so that compressed air is supplied into the electromagnetic valve system 10 from the compressed air supply device through the compressed air inlet 22. The supplied compressed air passes through the check valve 52 and further through the third and second openings 47-3 and 47-2 of the second electromagnetic valve 40 to reach the upper chamber 26. This causes an increase in pressure in the upper chamber 26. Consequently, the check valves 51 are closed to block air from flowing into the upper chamber 26 from the supply pipe 60 side. To inflate an air chamber 3, the associated first electromagnetic valve 30 is driven to the first position (FIG. 4). Consequently, compressed air passes from the lower chamber 27 through the check valve 53 and further through the first and third openings 37-1 and 37-3 of the first electromagnetic valve 30 and further passes through the supply pipe 60 and the tube 5 before being supplied into the associated air chamber 3, thus causing the air chamber 3 to inflate. At this time, the pressure in the lower chamber 27 decreases momentarily. However, the pressure in the upper chamber 26 does not decrease because backflow of air from the upper chamber 26 to the lower chamber 27 is blocked by the check valve 52 (FIG. 6). Accordingly, the check valve 51 that is closed by the pressure in the upper chamber 26 can maintain the closed state. That is, the air in the air chamber 3 having already been inflated is prevented from accidentally exiting through the check valve 51. When the first electromagnetic valve 30 is returned to the second position (FIG. 5), the air in the air chamber 3 is discharged through the second opening 37-2 of the first electromagnetic valve 30, and consequently the air chamber 3 deflates. To stop the massage apparatus 1, all the first electromagnetic valves 30 are returned to the second position to release the compressed air in all the air chambers 3 to the atmosphere from the second openings 37-2 of the first electromagnetic valves 30. The compressed air supply device is stopped, and the second electromagnetic valve 40 is also returned to the second position (FIG. 7) to release the air in the upper chamber 26 to the atmosphere through the second electromagnetic valve 40. In this way, the massage apparatus 1 is stopped in a safe condition in which no compressed air is left therein. It should be noted that, when the massage apparatus 1 is to be stopped, the second electromagnetic valve 40 may be returned to the second position before the first electromagnetic valves 30 are done to discharge the air in the air chambers 3 from the first opening 47-1 of the second electromagnetic valve 40 through the check valves 51.

Figure 8:
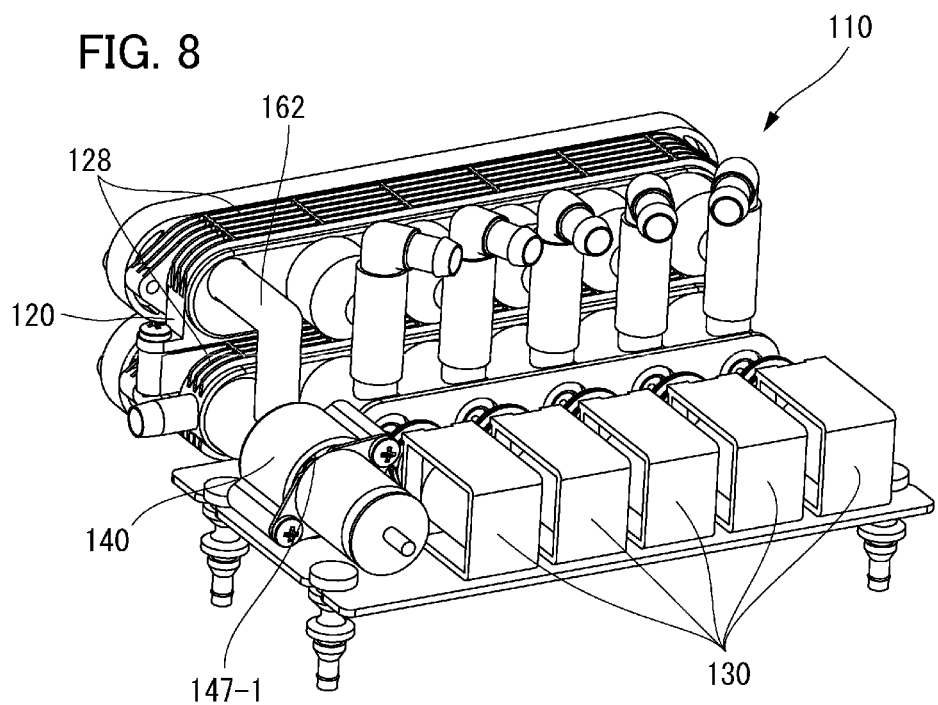
FIG. 8 is a perspective view of an electromagnetic valve system according to a second embodiment of the present invention.
Figure 9:
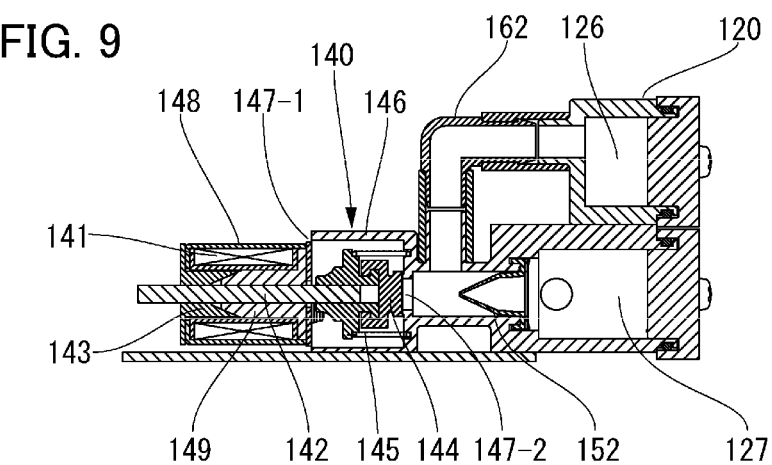
FIG. 9 is a sectional view of a second electromagnetic valve of the electromagnetic valve system shown in FIG. 8 when the second electromagnetic valve is in a first position.
Figure 10:
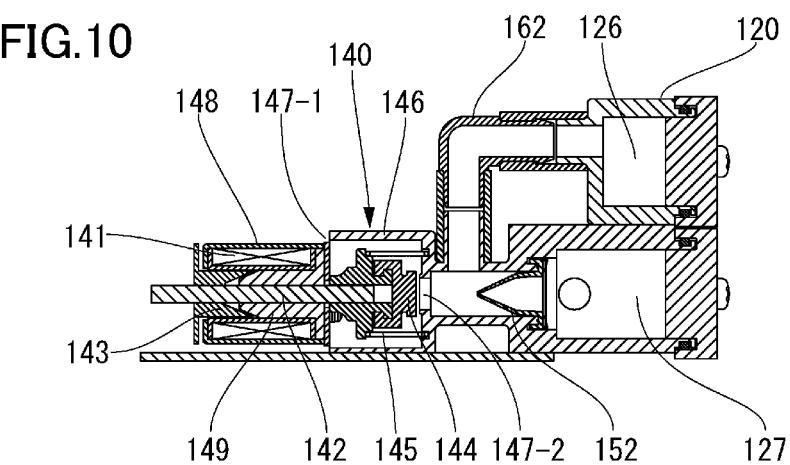
FIG. 10 is a sectional view of the second electromagnetic valve of the electromagnetic valve system shown in FIG. 8 when the second electromagnetic valve is in a second position.

FIG. 8 shows an electromagnetic valve system 110 according to a second embodiment of the present invention. The electromagnetic valve system 110 has substantially the same structure as that of the electromagnetic valve system 10 according to the first embodiment. The constituent elements of the electromagnetic valve system 110 are denoted by reference numerals in 100 series, and the two lower digits of the reference numerals are the same as the reference numerals of the corresponding constituent elements in the first embodiment. The electromagnetic valve system 110 according to the second embodiment differs from the electromagnetic valve system 10 according to the first embodiment mainly in the second electromagnetic valve 140. The second electromagnetic valve 140 has, as shown in FIGS. 9 and 10, a solenoid coil 141 disposed in a coil housing 148, a shaft 142 extending through the solenoid coil 141, a plunger 143 secured around the shaft 142 inside the solenoid coil 141, a plunger receiving member 149 secured to the coil housing 148 at the right side of the plunger 143 inside the solenoid coil 141, a valve element 144 secured to one end of the shaft 142 in a valve housing 146 connected to the right end (as seen in the figures) of the coil housing 148, and a spring 145 urging the valve element 144 leftward as seen in the figures. The second electromagnetic valve 140 further has a first opening 147-1 formed as a gap between the valve housing 146 and the coil housing 148 and a second opening 147-2 opened on the right end wall of the valve housing 146 so as to communicate with an upper chamber 126 through a connecting pipe 162. The second opening 147-2 also communicates with a lower chamber 127 of a header 120 through a duckbill check valve 152, and thus the upper chamber 126 and the lower chamber 127 are communicated with each other through the check valve 152, without through the second electromagnetic valve 140. When the solenoid coil 141 is supplied with electric power and thus excited, as shown in FIG. 9, the plunger 143 is attracted, against the urging force of the spring 145, rightward as seen in the figure to a position where the plunger 143 abuts against the plunger receiving member 149. When the second electromagnetic valve 140 is in this first position, the second opening 147-2 thereof is closed. When the voltage supplied to the second electromagnetic valve 140 drops below a given value, the magnetic force of the solenoid coil 141 of the second electromagnetic valve 140 that has been attracting the plunger 143 weakens, so that the plunger 143 is, as shown in FIG. 10, moved leftward as seen in the figure by the urging force of the spring 145, thereby bringing the second electromagnetic valve 140 to a second position. When the second electromagnetic valve 140 is in the second position, the second opening 147-2 is open and in communication with the first opening 147-1. Accordingly, the compressed air in the upper chamber 126 of the header 120 is discharged, and the pressure in the upper chamber 126 reduces. Consequently, the duckbill check valves 51 (FIG. 4) open, and the compressed air in the air chambers 3 is discharged into the atmosphere through the second and first openings 147-2 and 147-1 of the second electromagnetic valve 140.

The header 120 according to this embodiment has, as shown in FIG. 8, a multiplicity of fins 128 formed on the outer surface thereof to efficiently dissipate heat from the header 120 heated by compressed air.

Although the electromagnetic valve systems 10 and 110 according to the above-described embodiments each have five first electromagnetic valves 30, the number of first electromagnetic valves 30 may be varied according to need. For example, eight first electromagnetic valves 30 may be provided in correspondence to the massage devices 2 shown in FIG. 1. Further, it is not always necessary to use all the first electromagnetic valves 30 provided. If the number of air chambers 3 of the massage devices 2 is smaller than the number of first electromagnetic valves 30, the excess first electromagnetic valves 30 may be held in the second position so as not to be used.

The electromagnetic valve system 10 uses self-holding electromagnetic valves and is therefore capable of reducing the overall power consumption, even though it is necessary to use another electromagnetic valve of the automatic release type. Accordingly, the advantages of the present invention are effectively offered particularly when the electromagnetic valve system is driven by a battery as in the case of the electromagnetic valve system 10 according to the embodiment of the present invention. However, it is needless to say that the electromagnetic valve system may be driven by a power supply other than batteries, e.g. an AC power supply.

List of Reference Signs:

| | |
|---|---|
| 1: massage apparatus | 2: massage device |
| 3: air chamber | 10: electromagnetic valve system |
| 20: header | 21: header cap |
| 22: compressed air inlet | 26: upper chamber |
| 27: lower chamber | 30: first electromagnetic valve |
| 31: solenoid coil | 32: plunger |
| 33: permanent magnet | 34: valve element support member |
| 35: valve element | 36: spring |
| 37-1: first opening (of first electromagnetic valve) | 37-2: second opening (of first electromagnetic valve) |
| 37-3: third opening (of first electromagnetic valve) | 38: housing |
| 38a: end wall | 39: shock absorption member |
| 40: second electromagnetic valve | 41: solenoid coil |
| 42: shaft | 43: plunger |
| 44-1: first valve element | 44-2: second valve element |
| 45: spring | 46: valve housing |
| 47-1: first opening (of second electromagnetic valve) | 47-2: second opening (of second electromagnetic valve) |
| 47-3: third opening (of second electromagnetic valve) | 48: coil housing |
| 49: plunger receiving member | 51: (first) check valve |
| 52: (second) check valve | 53: (third) check valve |
| 60: supply pipe | 62: connecting pipe |
| 110: electromagnetic valve system | 120: header |
| 126: upper chamber | 127: lower chamber |
| 128: fin | 140: second electromagnetic valve |
| 141: solenoid coil | 142: shaft |
| 143: plunger | 144: valve element |
| 145: spring | 146: valve housing |
| 147-1: first opening (of second electromagnetic valve) | |
| 147-2: second opening (of second electromagnetic valve) | |
| 148: coil housing | 149: plunger receiving member |
| 162: connecting pipe | |

The invention claimed is:

1. An electromagnetic valve system for supplying and discharging compressed air into and from a plurality of air chambers of a massage device of a pneumatic massage apparatus, the electromagnetic valve system comprising:
  a compressed air inlet for receiving compressed air;
  a plurality of first electromagnetic valves, each to be connected to a corresponding one of the air chambers of the massage device, each of the first electromagnetic valves having a first opening communicating with the compressed air inlet, a second opening communicating with an outside atmosphere, and a third opening for communicating with an associated one of the air chambers, and each of the first electromagnetic valves being switchable between a first position where the second opening is closed and the first opening and the third opening communicate with each other and a second position where the first opening is closed and the second opening and the third opening communicate with each other;
  a second electromagnetic valve having a first opening communicating with the outside atmosphere and a second opening, the second electromagnetic valve being switchable between a first position where communication between the first opening of the second electromagnetic valve and the second opening of the second electromagnetic valve is cut off and a second position where the first opening of the second electromagnetic valve and the second opening of the second electromagnetic valve communicate with each other; and a plurality of first check valves provided, respectively, between the air chambers and the second opening of the second electromagnetic valve, the first check valves allowing air to flow from the air chambers toward the second opening of the second electromagnetic valve only when an air pressure on a second opening side of the second electromagnetic valve is lower than an air pressure on an air chamber side;

wherein each of the first electromagnetic valves comprises a solenoid coil; a plunger adapted to be magnetically attracted by the solenoid coil; a valve element attached to the plunger and adapted to selectively close the first opening of the first electromagnetic valve and the second opening of the first electromagnetic valve; a spring adapted to urge the plunger and maintain the first electromagnetic valve in the second position; and a permanent magnet adapted to magnetically attract the plunger and maintain the first electromagnetic valve in the first position against an urging force of the spring;

wherein the first electromagnetic valves are self-holding electromagnetic valves that maintain either the first position by the permanent magnet or the second position by the spring assumed thereby when a supply voltage to the first electromagnetic valves drops below a first given value even after the supply voltage to the first electromagnetic valves has dropped below the first given value; and wherein the second electromagnetic valve is an automatic release electromagnetic valve that switches over to the second position when a supply voltage to the second electromagnetic valve drops below a second given value.

2. The electromagnetic valve system of claim 1, further comprising:
a control device for controlling the first electromagnetic valves and the second electromagnetic valve, the control device being configured to control the second electromagnetic valve such that voltage supply to the second electromagnetic valve is stopped when the supply voltage to the second electromagnetic valve drops below a set value, thereby bringing the second electromagnetic valve to the second position.

3. The electromagnetic valve system of claim 1, wherein the second electromagnetic valve further comprises a third opening communicating with the compressed air inlet, so that, when the second electromagnetic valve is in the first position, the first opening of the second electromagnetic valve is closed, and the second opening of the second electromagnetic valve and the third opening of the second electromagnetic valve communicate with each other, and when the second electromagnetic valve is in the second position, the third opening of the second electromagnetic valve is closed, and the first opening of the second electromagnetic valve and the second opening of the second electromagnetic valve communicate with each other.

4. The electromagnetic valve system of claim 3, further comprising:
a second check valve between the compressed air inlet and the third opening of the second electromagnetic valve, the second check valve being configured to allow air to flow only in a direction from the compressed air inlet toward the third opening of the second electromagnetic valve.

5. The electromagnetic valve system of claim 1, wherein the second opening of the second electromagnetic valve also communicates with the compressed air inlet; and
wherein the second electromagnetic valve is configured to close the second opening of the second electromagnetic valve when the second electromagnetic valve is in the first position, and to open the second opening of the second electromagnetic valve such that the first opening of the second electromagnetic valve and the second opening of the second electromagnetic valve communicate with each other when the second electromagnetic valve is in the second position.

6. The electromagnetic valve system of claim 5, further comprising:
a second check valve between the compressed air inlet and the second opening of the second electromagnetic valve and between the compressed air inlet and the air chambers, the second check valve being configured to allow air to flow only in a direction from the compressed air inlet toward the second opening of the second electromagnetic valve and the air chambers.

7. The electromagnetic valve system of claim 1, further comprising:
a third check valve between the compressed air inlet and the first opening of each of the first electromagnetic valves, the third check valve being configured to allow air to flow only in a direction from the compressed air inlet toward the first opening of a corresponding one of the first electromagnetic valves.

8. The electromagnetic valve system of claim 1, wherein the supply voltage to the first electromagnetic valves is supplied by a battery.

9. The electromagnetic valve system of claim 8, wherein the supply voltage to the second electromagnetic valve is supplied by the battery.

10. The electromagnetic valve system of claim 1,
wherein, for each of the first electromagnetic valves, by applying a forward voltage to the solenoid coil to generate a magnetic force that increases magnetic attraction action of the permanent magnet, the plunger is attracted against urging force of the spring to bring the first electromagnetic valve to the first position; and
wherein, for each of the first electromagnetic valves, by applying a reverse voltage to the solenoid coil to generate a magnetic force that reduces the magnetic attraction action of the permanent magnet, the plunger is moved by the urging force of the spring to bring the first electromagnetic valve to the second position.

11. The electromagnetic valve system of claim 1, wherein the supply voltage to the second electromagnetic valve is supplied by a battery.

12. A pneumatic massage apparatus comprising:
a massage device fittable to a body, the massage device having a plurality of air chambers configured to be inflated and deflated by supplying and discharging compressed air thereinto and therefrom, respectively, to thereby act on the body;
a compressed air supply device separate from the massage device; and
the electromagnetic valve system of claim 1, wherein the compressed air inlet is connected to the compressed air supply device, and the third opening of each of the first electromagnetic valves is connected to an associated one of the air chambers;
wherein, when the supply voltage to the second electromagnetic valve drops below the second given value, the second electromagnetic valve switches over to the second position to allow air in any of the air chambers that is in an inflated state to be released to the outside atmosphere through the first opening of the second electromagnetic valve.

* * * * *